United States Patent [19]

Gulistan

[11] 4,285,380
[45] Aug. 25, 1981

[54] PANEL FASTENER

[75] Inventor: Bulent Gulistan, Woodland Hills, Calif.

[73] Assignee: VSI Corporation, Pasadena, Calif.

[21] Appl. No.: 25,363

[22] Filed: Mar. 30, 1979

[51] Int. Cl.³ ............................................. F16B 43/00
[52] U.S. Cl. .................................... 411/103; 411/338; 411/403; 411/432
[58] Field of Search ................... 151/69, 41.74, 41.75; 85/35, 32 R, 45, 9 R, 9 W; 81/121 R, DIG. 11

[56] References Cited

U.S. PATENT DOCUMENTS

| | | | |
|---|---|---|---|
| 2,914,984 | 12/1959 | Ansingh | 85/45 |
| 2,931,265 | 4/1960 | De Lacy | 85/45 |
| 2,949,143 | 8/1960 | Shur | 151/69 |
| 2,991,816 | 7/1961 | Harbison et al. | 151/69 X |
| 3,073,206 | 1/1963 | Rudolph | 85/45 |
| 3,221,589 | 12/1965 | Vander Sande et al. | 151/69 X |
| 3,916,736 | 11/1975 | Clemens | 81/DIG. 11 X |
| 4,069,855 | 1/1978 | Petroshanoff | 151/69 |
| 4,125,140 | 11/1978 | Basile | 151/69 |

Primary Examiner—Ramon S. Britts
Attorney, Agent, or Firm—Christie, Parker & Hale

[57] ABSTRACT

A grommet attached to a top panel captures a stud nut of a panel fastener through a retaining ring held by the grommet. A complimentary stud assembly attaches to a subpanel and receives the stud nut to clamp the panels together. The grommet has a stand-off base that projects axially from a counterbore in the top panel to form a barrier for a gasket. A flared end of the grommet and the standoff base clamp the top panel between them. The retaining ring compressively bears radially against the stud nut to retain it in any desired axial position and maintain axial alignment of the stud nut. The stud nut can draw completely into the top panel. The stud nut has a clear-through bore threaded at one end. A wrenching recess, defined by a hardened insert, occupies the other end of the bore. A plug separates the wrenching recess from the threads. A basket of the stud assembly attaches to the subpanel by rivets. A barrel attaches to the basket through lugs engaged in slots of down turned wings of the basket. Tabs at an extreme end of the barrel crimp into cooperating recesses of a head of the stud to retain the stud with the barrel. The stud extends axially within the barrel for engaging the stud nut. The barrel may press against the nut to restrain undesirable loosening.

12 Claims, 4 Drawing Figures

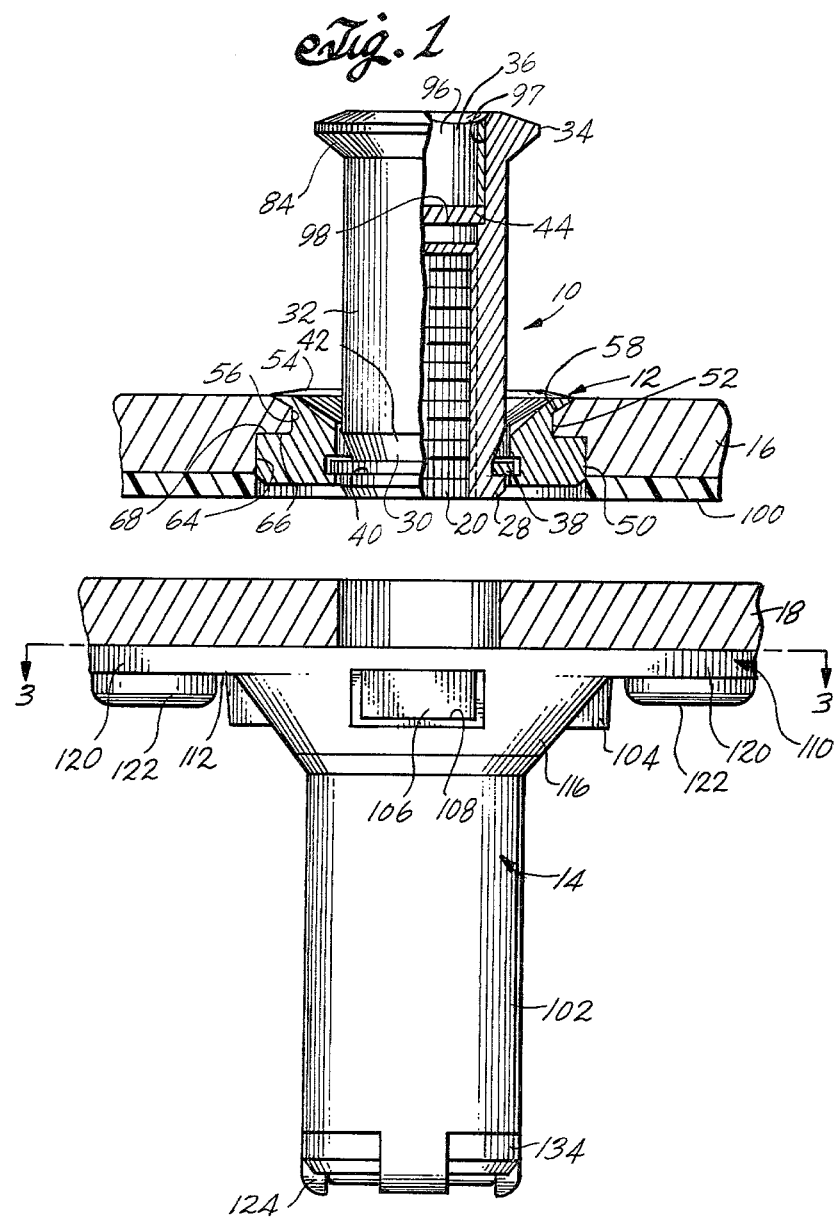
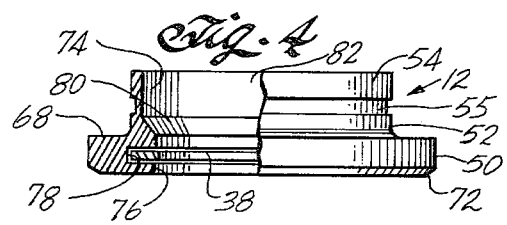

PANEL FASTENER

BACKGROUND OF THE INVENTION

The present invention relates to fasteners in general, and, more in particular, to panel fasteners.

Panel fasteners find application in many environments. One such environment is in aircraft where panels of the aircraft must be periodically removed from substructures to gain access to interior spaces.

Panel fasteners in the art include one type that employs a stud assembly mounted to a subpanel, understructure, or substructure through a basket, which assembly includes an axially extending, male threaded stud held in place by a barrel within the barrel. The stud points toward the understructure, but terminates behind it. A stud nut of the panel fastener has a head for bearing on a top panel and internal threads for engaging the threads of the stud. A retaining ring in a groove in the stud nut can retain the stud nut with the top panel. The stud nut tightens onto the threads of the stud to clamp the top panel and subpanel together.

In high performance and supersonic aircraft the skin of the aircraft carries load. Panel fasteners used with removable panels of that skin are required to have substantial structural strength. Because the skin carries load, when a panel is removed stresses move the understructure. This results in shifts in the hole pattern in the understructure. The movement occurs progressively with the detachment of more and more panel fasteners of a panel with the last remaining panel fasteners of a panel substantially loaded in shear making their removal difficult. Reinstallation requires a progressive shifting back of the hole pattern to the mated fit between the panel and the understructure. Thus the panel fastener must be removable and installable over a reasonable range of deflection between a substructure and a panel in which the nut of the fastener is attached.

This deflection between the substructure and the panel occurs both axially of the panel fastener, by way of gaps between the panel and the substructure, and radially of the panel fastener by way of shifting of the panel over the substructure in the plane of the panel. Gap closures of a magnitude of 0.125 inches may be required. Hole misalignment of a magnitude of 0.040 inches may have to be accommodated.

Because of the gap misalignment that must be accommodated, the panel fastener must have a fairly long stud nut to reach the stud before gap closure can occur. Lateral misalignment requires that the stud nut draw completely within the top panel to avoid catching on the substructure.

In the past it has been the practice to provide a retaining ring which functions to retain the stud nut with the top panel. When the stud nut retracts, the retaining ring snaps into an external groove on the stud nut to prevent withdrawal of the stud nut from the panel by interference of the retaining ring with the panel. The stud nut with this arrangement can freely move with respect to the top panel towards the substructure. This makes proximating the stud nut with the stud in the substructure difficult when the top panel lies below the substructure because the stud nut by its own weight wants to go into the fully retracted position away from the stud.

The retaining ring in this commercial version of a panel fastener also may be exposed when the stud nut moves from within the top panel towards the substructure. The retaining ring can come off the stud nut losing its function and permitting the stud to separate from the top panel.

Another problem attends exposed lock rings. This problem results from the inevitable use of gasket material on the panels. Gasket material can contact the lock ring when the lock ring is in its open position and prevent the lock ring from closing. Closure is necessary to permit full withdrawal of the stud nut into the top panel for and removal of the top panel from the substructure when some slip must occur.

U.S. Pat. No. 3,765,465 to Bulent Gulistan, the inventor of the subject matter of the present specification, discloses a panel fastener that employs a grommet to retain the retaining ring. The grommet has a head for bearing on the exposed side of the top panel and an axially extending portion that is flared over the bottom of the top panel to secure the grommet in place. With this arrangement the retaining ring is captive and the problem of its loss when the extension of the stud nut is overcome. Gasket material, however, can still reach the region where the lock ring is present and interfere with the proper function of that ring as by locking it open, because no barrier exists to stop the gasket material. The required flare at the bottom of the grommet is not thick enough in the axial direction to provide a barrier. Further, gasket material can enter the barrel and clog an annular space between the stud and barrel wall to prevent satisfactory operation of the cooperating stud nut. In a serious case, the stud nut would not be able to fully seat on the grommet and top panel because of the interfering gasket material.

The extent of protrusion of a panel fastener within the interior space behind the substructure or panel must of necessity be as small as possible because of weight and space considerations, especially in high performance aircraft. Constraints as to protrusions include the requirement of recessed heads in panel fasteners and of the provision of an axial space for wrenching the stud nut. A second constraint includes the requirement of having sufficient numbers of threads for effective engagement between the stud nut and the stud. Additionally, panel fasteners are used over and over again. Problems have been experienced in the past with thread locks losing effectiveness because of wear of the threads deformed to produce the lock. A wrenching recess in the head of the nut can strip with repeated use.

SUMMARY OF THE INVENTION

In its various aspects, the present invention provides in a panel fastener the assurance of thread registration of a stud nut with a stud, an enclosed and protected retaining ring that positively retains the stud nut in any axial position relative to a top panel in which it is mounted, the ability to completely withdraw the nose of the stud nut within the top panel, a positive barrier against gasket fouling or clogging, a hardened wrenching recess received in the nut by virtue of a unique, clear-through bore construction, substantial thread engagement and wrenching recess depth, and a unique lock that avoid thread wear.

In one aspect, the present invention provides a grommet of the panel fastener adapted to be fully captured by a top panel. The grommet has an axial bore with an internal groove that receives and captures a retaining ring. The grommet also defines in cooperation with the top panel a a standoff base that radially interferes with a gasket used with the top panel to prevent material of that gasket from interfering with the lock ring or from interfering with any other part of the fastener. The grommet has a connecting neck integral with the standoff base and connecting that base with a seating and clamping section. This section is flared over the top panel to compliment the standoff base in clamping the panel between them and securing the grommet to the panel. The section also provides a seat for a head of the stud nut. The seating and clamping section prior to flaring has a major diameter no greater than the diameter of the neck, and less than the major diameter of the standoff base. Preferably, the seating and clamping section is flared over onto a conical recess formed in the top panel, and itself forms a conical seat for cooperating with a conical head of the stud nut. The grommet retains the lock ring and permits the lock ring to constantly exert a compressive force on the outside of the stud nut regardless of the position of the stud nut. The stud nut can then be positioned at any desired axial location and will stay at the location without outside assistance.

The stud nut of the present invention contemplates a clear through bore having a threaded section and a wrenching section separated by a plug. The wrenching section is defined by a hardened insert adapted to receive a male wrenching tool. The insert preferably seats in a well formed in the bore by broaching. The plug bottoms on the base of the well. Opposite the insert, the stud nut is threaded for cooperation with the stud of the panel fastener. This arrangement permits a comparatively short overall length of the stud nut and thereby avoids excessive protrusion of the system on the back side of the substructure and reduces the overall weight of the system. The arrangement also permits sufficient overall length to close gaps between the substructure and the panel, very reliable thread engagement between the stud nut and the stud, and a very strong wrenching recess. Moreover, the stud nut can be drawn completely inside the top panel so as to avoid the nose of the stud nut from hanging up on the substructure during disassembly of the fastener.

The stud nut has a head of a diameter larger than the balance of the stud nut to bear on the grommet and provide clamping force on a panel. Preferably, the underside of the head is conically shaped to cooperate with a conical seat of the grommet and effect a flush mounted fastener. The stud nut continues with a smooth shank portion that extends from the head to an annular groove adjacent the nose of the nut for the retaining ring. This shank portion has a diameter sufficiently large to force the retaining ring to act in radial compression against it. The retaining ring being captured in the groove in the grommet and applying a radial compressive force on the shank of the stud nut keeps the stud nut at any desired location between the head and the nose. The engagement of the stud nut by the lock ring also orients the stud nut to maintain its axial alignment and thereby to assure correct thread engagement with the stud and avoid cross threading. The nose end of the stud nut includes the nose proper which defines one side of the annular groove. The nose can be viewed as a flange with a right cylindrical shoulder against which the retaining ring can bear. A tapered wall of the groove progresses continuously from its smallest diameter to the outside diameter of the shank of the stud nut. This provides a ramp over which the retaining ring can travel onto the outside wall of the shank. Thus the retaining ring in the groove is capable of bearing against the flange of the nose and against the grommet to positively retain the stud nut with the grommet and the top panel.

The stud nut and grommet of the present invention cooperate with a stud assembly that is more or less standard. Briefly, that assembly includes a barrel mounted in a basket as through opposed radially extending lugs received in slots in wings of the basket. Some play between the barrel and the basket is possible because of this relationship. The barrel has a bearing base with a bearing surface in a radial plane, the latter for bearing against a cooperating surface of the basket. Ears of the basket extend radially of its axis for receipt of rivets that attach the entire stud assembly to the substructure. The remote end of the barrel has a plurality of tabs received in cooperating recesses in a head of a stud to constrain the stud against rotation. The stud has a male threaded portion extending axially upward from the head and towards the substructure for threaded engagement by the threads of the stud nut.

The present invention also contemplates a process for the fabrication of the panel fastener just described, and in particular, the stud nut of the panel fastener just described. The method of fabrication includes forming a clear-through bore in the stud nut from its head through its nose. Thereafter, the head end of the stud nut is broached to form a recess or well that receives a hardened wrenching insert. Alternatively, the wrenching recess can be formed by the broaching. In either event, the bottom of the broach section is defined by a radial shoulder. An end of the bore opposite the head is threaded for receipt of the threaded stud. Thereafter, a plug is inserted at the base of the well to separate the threaded end of the stud nut from the broached end. The plug may be thin. A hardened insert is press fitted in the broached well, which insert defines a wrenching socket for receipt of a wrenching tool. This construction affords a stud nut with a strong wrenching section and comparatively low overall length. The low overall length results from the elimination of drill lead space at the wrenching socket and in the threaded bore of prior art stud nuts.

These and other features, aspects and advantages of the present invention will become more apparent from the following description, appended claims and drawings.

BRIEF DESCRIPTION OF THE FIGURES

FIG. 1 illustrates in elevation the improved panel fastener of the present invention partly in section and partly broken away, in attendant panels with the panel fastener open;

FIG. 4 is an elevational view of the grommet of the fastener of the present invention, partly in half-section.

DESCRIPTION OF THE PREFERRED EMBODIMENT

Figure 2:
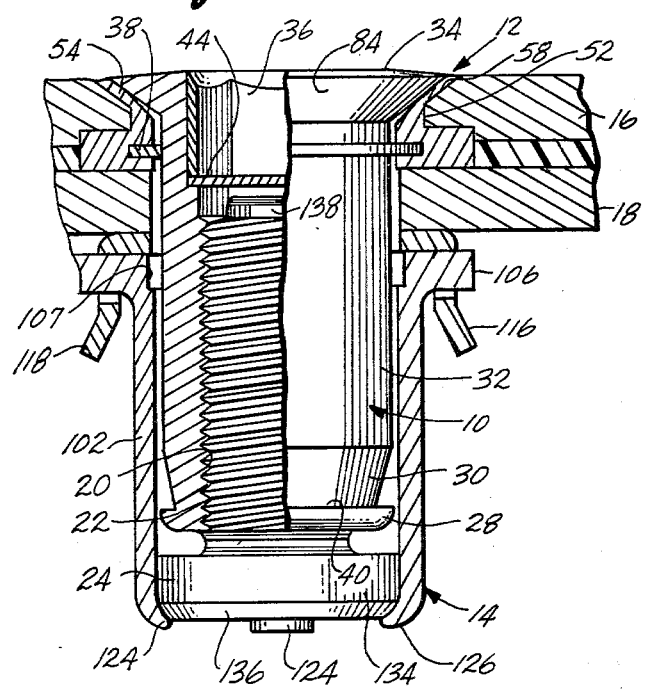
FIG. 2 is an elevational view of the panel fastener of FIG. 1 together with associated panels taken generally at right angles to the view in FIG. 1, with the fastener partly in section and partly broken away and with the fastener closed.

With reference to the Figures, the panel fastener of the present invention includes a stud nut 10, a grommet 12, and a stud assembly 14. In FIGS. 1 and 2 the fastener is shown installed on a top panel 16 and substructure in the form of a subpanel 18.

In general, stud nut 10 has an internally threaded bore 20 adapted to cooperate with male threads of male threaded section 22 of a stud 24 by threaded engagement of the two to pull panels 16 and 18 together. The nut further includes a nose 28, an annular groove 30 adjacent the nose, and a right cylindrical shank 32. A head 34 caps the stud nut and provides for a bearing against grommet 12. A wrenching socket 36, which may be hexagonal in cross section, receives a cooperating wrenching tool for the tightening and loosening of the stud nut. A retaining ring 38 is received in the groove 30 and is capable of bearing on a radial shoulder 40 of nose 28. Groove 30 tapers away from shoulder 40 towards head 34 to define a ramp 42 over which ring 38 can expand. Ramp 40 is a truncated cone.

Wrenching socket 36 and threaded section 22 are formed out of a common, clear-through bore. A plug 44 in that bore separates the two sections.

With particular reference to FIGS. 1 and 4, grommet 12 includes a standoff base 50 that extends generally radially from the longitudinal axis of the fastener and axially along that axis. A neck 52 of lesser major diameter than the standoff base extends axially away from the standoff base towards the head of the stud nut. A conical seating and clamping section 54 extends above the neck. As seen in FIG. 4, prior to setting in the top panel the seating and clamping section constitutes a right cylindrical continuation of the neck. This enables the grommet to be received in a bore 56 in the top panel. Thereafter, the seating and clamping section is flared by plastically deforming it into engagement with a conical seat 58 in the panel. An external groove 59 between seating and clamping section 54 and neck 52 defines the limit of flaring.

Grommet 12 is adapted to be received in a counterbore 64 of top panel 16. That counterbore has a radial shoulder 66 against which a cooperating radial shoulder 68 of standoff base 50 bears. Thus the grommet is permanently affixed in top panel 16 by clamping against an annular ring of that panel that exists between seating and clamping section 54 and shoulder 68 of standoff base 50.

Standoff base 50 is adapted to extend slightly below the lower surface of top panel 16. The standoff base has a chamfer 72 at its extreme end. Grommet 12 also includes an axial bore 74. That bore radially within standoff base 50 is of minor diameter, as indicated by reference numeral 76. An annular groove 78 within bore section 76 and standoff base 50 receives retaining ring 38. The external diameter of retaining ring 38 in the ring's relaxed position is less than the external diameter of the groove that receives the ring to permit expansion of the ring radially outward. Bore 74 further includes a conical transition section 80 that extends from minor diameter portion 76 to a major diameter portion 82 of bore 74. Transition section 80 forms the interior wall of neck 52. The radial wall thickness of the grommet in the neck exceeds that of the grommet in the seating and clamping section 54. As can be seen in FIGS. 1 and 2, once seating and clamping section 54 flares onto conical seat 58, an essentially continuous conical seating surface formed of the interior surface of seating and clamping section 54 and neck 52 is defined.

Ring 38 is a slit ring to permit elastic expansion and contraction over a comparatively large diametral difference between a relaxed position in groove 30 and an expanded position on shank 32.

Head 34 of stud nut 10 has a conical face 84 adapted to seat on the cooperating surface of seating and clamping section 54 of grommet 12 so that the head of the fastener when set is about flush with the surface of top panel 16. This can be seen in FIG. 2. Head 34 has a major diameter exceeding the diameters of the balance of the stud nut. The upper surface of head 34 may have a slight conical rise or lie in a plane radial to the axis of the fastener.

As can also be seen by comparing FIGS. 1 and 2, retaining ring 38 ramps up ramp 42 onto the right cylindrical surface of shank 32 of the stud nut upon the stud nut being pushed axially towards stud nut assembly 14. The retaining ring bears compressively in radial compression against the outside surface of the shank when not at home in groove 30. This positive force tends to orient the stud nut and maintain it in axial alignment. Some camming of the stud nut with respect to the retaining ring to obtain an off axis orientation is possible with a positive side load. The retaining ring also keeps the stud nut in any desired longitudinal position because of the compressive force applied to the stud nut by the retaining ring establishes a frictional force between shank 32 and the retaining ring that resists displacement of the stud nut.

For maintanence of axial alignment while retaining ring 34 is out of groove 30, the inside wall of retaining 34 should be right cylindrical and shank 32 should be right cylindrical. To maintain axial alignment of the stud nut while the retaining ring is home in groove 30, the surface of the ring in bearing with radial shoulder 40 should itself be radial. Nose 28 of stud nut 10 has a rounded end for guidance into the stud assembly.

Stud nut 10 further includes an insert 96 that defines hexagonal wrenching socket 36. This insert may be made of a hard material to prevent rounding and subsequent failure of the wrenching flats of the socket. Insert 96 may be held in nut 10 by a press fit against a wall 97 of the nut. This restraining wall for insert 96 may be formed by broaching and by forming a well. Plug 44 between the insert and threads 22 separate the two. The plug seats at the bottom of the well and is held there by a shoulder 98 of shank 32 and the end of insert 96. Shoulder 98 is radial so that it does not take up axial space.

It is possible to define the wrenching socket by broaching parent material of the head and shank with the form of the socket, usually hexagonal. It is preferred to use the hardened insert because of its strength.

The length of the insert can be made materially greater than the insert length of the wrenching recess in prior art panel fasteners of the type disclosed here. Similarly, the length of the threads of the stud nut may also be made longer than the length of the corresponding threads of prior art fasteners. The reason for this is that with a given overall length of this stud nut, a constraint dictated by protrusion restrictions and weight, no space is required for drill lead distance that would be required to form dead end bores in the stud nut that would be necessary for the formation of the wrenching socket and threaded bore.

Alternatively, the wrenching socket can be formed directly during broaching and without the hardened insert. Because the insert is hardened, the alternate approach is not preferred.

In sequence of formation a hole is drilled completely through the stud nut. THereafter the well for the insert is broached. In the alternative version, the socket is broached into the walls of parent material. The stud nut is threaded before or after the broaching operation. Thereafter the plug is installed. Finally, the insert is installed. This arrangement permits the devotion of longer axial space to the wrenching sockets and the threads.

Head 134 of the stud nut has a chamfer 136. Head 134 extends with a right cylindrical outer surface from chamfer 136 to threads 22 of the stud. The head of the stud resides within the confines of the barrel. A nose 138 of the stud may pilot the stud nut for proper registration of the threads of that nut with the stud.

A gasket 100 on top panel 16 proximates an axially protruding portion of standoff base 50 and that portion that is proximated forms a barrier and dams the gasket to prevent it from flowing either into the vicinity of retaining ring 38 or into barrel 14.

Figure 3:
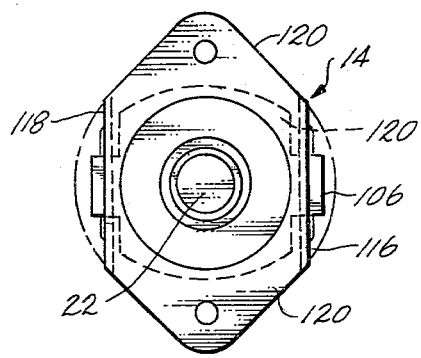
FIG. 3 is an end from the barrel end of the fastener of FIG. 2 taken along lines 3—3 of FIG. 1.

Stud Assembly 14 includes a barrel 102 that extends longitudinally. A base 104 of the barrel defines its near end. A pilot bore 107 guides the entry of nose 28 into the barrel. Lugs 106 of the base extend radially from the axis of the fastener and are received in slots 108 of a basket 110 and serve to hold the barrel to the basket. The lugs are formed from the base by shearing away material to from flats to either side of the lugs (see FIG. 3). The base serves as a bearing member against a cooperating base section 112 of the basket. Opposed wings 116 and 118 of the basket extend down and away from subpanel 18 and flare slightly radially outward from the axis of the panel fastener. The wings have A pair of mounting ears 120 of the base section receive rivets 122 that affix the basket to subpanel 18. Barrel 102 at its remote end has a plurality of regularly spaced tabs 124 that are bent into cooperating recesses 126 in a head 134 of stud nut 24. Barrel 102 may be deformed radially inward to present a slightly elliptical inside wall that compressively bears on the outside wall of shank 32 of the stud nut to resist unthreading of the fastener.

In the assembly of the fastener, the stud nut generally is placed into the configuration shown in FIG. 1. There, retaining ring 38 retains it in place. The axial position of the nut can be varied at well between the FIGS. 1 and 2 orientation, and maintained by the frictional force applied to the nut by the retaining ring. Generally however, that axial position of the stud nut will be with nose 28 inside the lower surface defined by gasket 100. The stud nut may then be pressed against the resistance of the retaining ring into engagement with stud 24. A wrenching tool may then be applied through wrenching socket 36 of the stud nut to tighten it on the threads of the stud and draw top panel 16 and sub panel 18 into engagement. It should be noted that during this engagement the axial alignment of the stud and stud nut prevents cross threading.

The present invention provides a panel fastener of the type that employs an enclosed and protected retaining ring. The standoff base of the grommet protects the retaining ring from jamming open as a result of gasket material clogging. The closed retaining ring itself avoids inadvertant loss of the retaining ring and its function which occasionally plagued prior art panel fasteners of the type having a retaining ring that traveled with the nose of the stud nut. The retaining ring by frictionally engaging the stud nut between the stud nut head and nose positively orients the stud nut axially of the fastener system so that the stud nut approaches the stud without substantial risk of cross threading. Some degree of camming of the retaining ring can orient the stud nut off axis if necessary for engaging the stud. The nose of the stud nut retracts into the top panel so interference of the nose with understructure during panel removal does not occur. The barrel lends itself to crimping to form an acircular interior wall, for example an elipse, the surface of which adjacent the minor axis engaging the outside surface of the stud nut to prevent rotation of the stud nut with respect to the stud except under action of a wrenching tool. This crimp acts like a thread lock but does not suffer from the wear attendant with the making of several joints with the fastener.

The present invention has been described with reference to a preferred embodiment. The spirit and scope of the appended claims should not, however, necessarily, be limited to the foregoing description.

What is claimed is:

1. In a panel fastener of the type having a stud assembly that has a stud and which is adapted to be attached to a substructure, a stud nut adapted to be attached to a panel and to engage the stud, and a retaining ring adapted to hold the stud nut to a top panel while permitting the stud nut to move along its axis for approaching toward and retracting away from the stud assembly, the retaining ring being in compressive radial bearing with the stud nut over a continuous range of axial positions of the stud nut with respect to the panel, an improvement which comprises:
   (a) a clear through bore in the stud nut;
   (b) an internally threaded section at one end of the bore;
   (c) a hardened wrenching insert at the other end of the bore having a wrenching socket adapted to receive a wrenching tool;
   (d) a thin plug in the bore between the wrenching insert and the internal threads to separate the two;
   (e) a grommet adapted for attachment to the top panel, and having a wall defining an axial bore for receiving the stud nut, a standoff base adapted for receipt in a counterbore in the top panel and for extending below the lower surface of the top panel to present a barrier to a gasket from moving radially inward towards the axis of the stud nut, an annular interior groove in the standoff portion opening into the axial bore and spaced from a lower surface of the standoff portion by a portion of the wall defining the axial bore, the groove receiving and capturing the retaining ring, a neck integral with and axially adjacent the standoff base, and having a major outer diameter less than the major outer diameter of the standoff base, and a seating and clamping section integral with and axially adjacent the neck, the seating and clamping section being adapted to be flared radially outward from the axis of the axial bore to define a conical seat for a head of the stud nut and to cooperate with the standoff base in clamping the grommet to the top panel.

2. The improvement claimed in claim 1 wherein the axial distance between the wrenching insert and the threads is less than the distance defined by the sum of the thickness of the plug and the lead distance of drills that would have been necessary to form two dead end bores for the internal threads and wrenching recess, respectively.

3. The improvement claimed in claim 2 wherein the end of the bore in receipt of the wrenching insert is broached, and the wrenching insert has a complimentary periphery in engagement with broached end of the bore to prevent the insert from rotating in the bore.

4. The improvement claimed in claim 3 wherein the stud nut has a right cylindrical shank, a head capping the shank at one end of the stud nut and in receipt of the wrenching insert, a nose at the other end of the stud nut, and an external groove between the nose and the shank, the groove being for receipt of the retaining ring.

5. The improvement claimed in claim 4 wherein the groove has a ramp from the bottom of the groove to the exterior surface of the shank, and the nose has a radial shoulder defining one end wall of the groove.

6. The improvement claimed in claim 5 wherein the stud assembly includes a barrel in receipt of the stud, the barrel being radially deformed to provide rotational resistance between it and the stud nut.

7. The improvement claimed in claim 6 wherein the grommet includes an external groove between the neck and the clamping and seating section to define the limit of flaring of that section, and the neck includes a conical interior surface adapted to merge into and complement the interior surface of the clamping and seating section in defining a seat for the head of the stud nut.

8. In a panel fastener of the type having a stud nut, a stud assembly including a stud adapted for threaded receipt in the stud nut, a retaining ring for retaining the stud nut in a top panel while permitting movement thereof towards and away from the plane of such panel, and a grommet, the grommet being adapted for attachment to the top panel and capturing the retaining ring, the grommet having a wall defining an axial bore for receipt of the stud nut, an improvement in the grommet comprising:

(a) a standoff base having a section of the axial bore, being adapted for receipt in a counterbore of the top panel and for extending below the lower surface of the top panel to present a barrier to a gasket against the latter moving radially inward towards the axis of the stud nut, and an annular, interior groove in the axial bore spaced above a lower surface of the base by a portion of the wall of the axial bore, the groove receiving and capturing the retaining ring;

(b) a neck integral with and axially adjacent the standoff base, the neck having a section of the axial bore, the neck also having a major outer diameter less than the major outer diameter of the standoff base; and (c) a seating and clamping section integral with and axially adjacent the neck, the seating and clamping section having a section of the axial bore, the seating and clamping section being adapted to be flared radially outward from the axis of the axial bore to define a conical seat for a head of the stud nut and to cooperate with the standoff base in clamping the grommet to the top panel.

9. The improvement claimed in claim 8 including an external groove between the neck and the clamping and seating section.

10. The improvement claimed in claim 8 wherein the neck has a conical interior surface for complimenting an interior surface of the clamping and seating section in providing a seat for the head of the stud nut.

11. The improvement claimed in claim 10 including an external groove between the neck and the clamping and seating section.

12. The improvement claimed in claim 11 wherein the retaining ring is split and has substantially circular inner and outer circumferences.

* * * * *

UNITED STATES PATENT AND TRADEMARK OFFICE
CERTIFICATE OF CORRECTION

PATENT NO. : 4,285,380

DATED : August 25, 1981

INVENTOR(S) : Bulent Gulistan

It is certified that error appears in the above—identified patent and that said Letters Patent is hereby corrected as shown below:

In the abstract: Line 19, "down turned" should be --downturned--

In the specification: Column 1, line 31, "with" should be --and--; Column 1, line 32, after "panel" insert --are--; Column 1, line 32, after "shear" insert a comma --,--; Column 1, line 68, after "nut" insert a comma --,--; Column 2, line 9, delete "and"; Column 2, line 10, delete "must occur" and insert --occurs--; Column 2, line 19, "when" should be --from--; Column 2, line 60, "avoid" should be --avoids--; Column 3, line 23, "clear through" should be --clear-through--; Column 3, line 46, "flush mounted" should be --flush-mounted--; Column 4, line 36, "press fitted" should be --press-fitted--; Column 4, line 51, after "invention" insert a comma --,--; Column 4, line 57, after "away" insert a comma --,--; Column 4, line 62, "half-section" should be --half section--; Column 5, line 17, "40" should be --42--; Column 5, line 29, after "panel" insert a comma --,--; Column 5, line 49, "That" should be --The--; Column 6, line 21, "off axis" should be --off-axis--; Column 6, line 25, after "ring" insert --and--; Column 6, line 29, "34" should be --38--; Column 6, line 29, after "retaining" insert --ring--; Column 6, line 30, "34" should be --38--; Column 7, line 2, "THereafter" should be --Thereafter--; Column 7, line 17, after "50" insert a comma --,--; Column 7, line 20, "barrel" should be --stud assembly--; Column 7, line 21, "Assembly" should be --assembly--; Column 7, line 25, delete "and" and insert therefor a comma --,--; Column 7, line 26, after "110" insert a comma --,--; Column 7, line 28, "from" should be --form--; Column 7, line 33, "A" should be --a--; Column 7, line 34, after "section" insert --to--; Column 7, line 45, "well" should be --will--; Column 7, line 47, after "Generally" insert a comma --,--; Column 7, line 54, "sub panel" should be --subpanel--; Column 7, line 57, "cross threading" should be --cross-threading--; Column 7, line 63, "inadvertant" should be

UNITED STATES PATENT AND TRADEMARK OFFICE
CERTIFICATE OF CORRECTION

PATENT NO. : 4,285,380
DATED : August 25, 1981
INVENTOR(S) : Bulent Gulistan

It is certified that error appears in the above—identified patent and that said Letters Patent is hereby corrected as shown below:

--inadvertent--; Column 7, line 66, after "ring" insert a comma --,--; Column 7, line 68, after "nose" insert a comma --,--; Column 8 line 2, "cross threading" should be --cross-threading--; Column 8, line 9, after "which" insert --is--.

In the claims: Claim 1, column 8, line 39, at end of the line insert --and--; Claim 1, column 8, line 52, at end of the line delete the comma ",".

Column 2, line 67, delete "a" second occurrence; Column 3, line 6, delete "compliment" and insert therefor --complement--.

In the claims: Claim 3, column 9, line 3, delete "complimen-" and insert therefor --complemen---; Claim 3, column 9, line 4, before "broached" insert --the--; Claim 10, column 10, line 28, delete "complimenting" and insert therefor --complementing--.

Signed and Sealed this

Thirtieth Day of March 1982

[SEAL]

Attest:

GERALD J. MOSSINGHOFF

*Attesting Officer*   *Commissioner of Patents and Trademarks*

REEXAMINATION CERTIFICATE (359th)
United States Patent [19]
Gulistan

[11] B1 4,285,380
[45] Certificate Issued Jun. 11, 1985

[54] PANEL FASTENER

[75] Inventor: Bulent Gulistan, Woodland Hills, Calif.

[73] Assignee: VSI Corporation, Pasadena, Calif.

Reexamination Request:
No. 90/000,196, May 6, 1982

Reexamination Certificate for:
Patent No.: 4,285,380
Issued: Aug. 25, 1981
Appl. No.: 25,363
Filed: Mar. 30, 1979

Certificate of Correction issued Mar. 30, 1982.

[51] Int. Cl.³ .............................................. F16B 43/00
[52] U.S. Cl. .................................. 411/103; 411/338; 411/403; 411/432
[58] Field of Search ............... 411/105, 103, 106, 107, 411/353, 352, 111, 113, 403, 402

[56] References Cited

U.S. PATENT DOCUMENTS

| | | | |
|---|---|---|---|
| 2,742,072 | 4/1956 | Murphy | 411/105 |
| 2,914,984 | 12/1959 | Ansingh | |
| 2,931,265 | 4/1960 | DeLacy | |
| 2,949,143 | 8/1960 | Shur | 411/353 |
| 2,991,816 | 7/1961 | Harbison et al. | |
| 3,073,206 | 1/1963 | Rudolph | 411/410 |
| 3,217,774 | 11/1965 | Pelochino | |
| 3,221,589 | 12/1965 | Vander Sande et al. | 411/9 X |
| 3,289,726 | 12/1966 | Sauter | |
| 3,583,461 | 6/1971 | Klaus | |
| 4,069,855 | 1/1978 | Petroshanoff | |
| 4,125,140 | 11/1978 | Basile | 411/106 |

OTHER PUBLICATIONS

Sales Catalog of Tridair Industries, Drawing No. CA 18233-Grommet Assy, Special, Stud Hold-Out, Sheets 1 & 2 of 2.
Sales Catalog of Tridair Industries, Drawing No. CA 21038-[]-[], Grommet Metallic, Sheet 1 of 1.

*Primary Examiner*—Ramon S. Britts

[57] ABSTRACT

A grommet attached to a top panel captures a stud nut of a panel fastener through a retaining ring held by the grommet. A complimentary stud assembly attaches to a subpanel and receives the stud nut to clamp the panels together. The grommet has a stand-off base that projects axially from a counterbore in the top panel to form a barrier for a gasket. A flared end of the grommet and the standoff base clamp the top panel between them. The retaining ring compressively bears radially against the stud nut to retain it in any desired axial position and maintain axial alignment of the stud nut. The stud nut can draw completely into the top panel. The stud nut has a clear-through bore threaded at one end. A wrenching recess, defined by a hardened insert, occupies the other end of the bore. A plug separates the wrenching recess from the threads. A basket of the stud assembly attaches to the subpanel by rivets. A barrel attaches to the basket through lugs engaged in slots of down turned wings of the basket. Tabs at an extreme end of the barrel crimp into cooperating recesses of a head of the stud to retain the stud with the barrel. The stud extends axially within the barrel for engaging the stud nut. The barrel may press against the nut to restrain undesirable loosening.

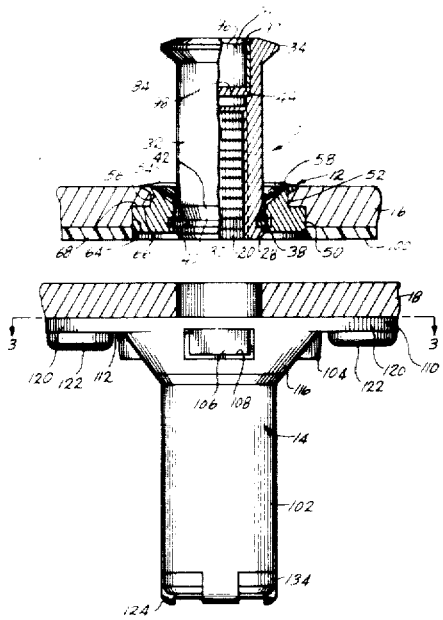

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12 is confirmed.

* * * * *